(12) United States Patent
Pettyjohn et al.

(10) Patent No.: US 7,418,523 B2
(45) Date of Patent: Aug. 26, 2008

(54) OPERATION OF A MULTIPLICITY OF TIME SORTED QUEUES WITH REDUCED MEMORY

(75) Inventors: Ronald L. Pettyjohn, Concord, MA (US); Walter C. Milliken, Dover, NH (US)

(73) Assignee: Ericsson AB, Stockholm (SE)

( * ) Notice: Subject to any disclaimer, the term of this patent is extended or adjusted under 35 U.S.C. 154(b) by 874 days.

(21) Appl. No.: 10/056,609

(22) Filed: Jan. 24, 2002

(65) Prior Publication Data

US 2003/0046414 A1   Mar. 6, 2003

Related U.S. Application Data

(60) Provisional application No. 60/264,095, filed on Jan. 25, 2001.

(51) Int. Cl.
*G06F 15/16* (2006.01)
*G06F 11/00* (2006.01)

(52) U.S. Cl. .................. 709/250; 709/232; 370/235

(58) Field of Classification Search .............. None
See application file for complete search history.

(56) References Cited

U.S. PATENT DOCUMENTS

| | | | |
|---|---|---|---|
| 5,150,358 A | 9/1992 | Punj et al. ................ 370/84 |
| 5,521,923 A | 5/1996 | Willmann et al. .......... 370/94.1 |
| 5,533,020 A | 7/1996 | Byrn et al. ................. 370/60.1 |
| 5,675,576 A | 10/1997 | Kalampoukas et al. ...... 370/232 |
| 5,748,614 A | 5/1998 | Wallmeier .................. 370/235 |
| 5,926,459 A * | 7/1999 | Lyles et al. ................. 370/230 |
| 5,940,397 A | 8/1999 | Gritton ...................... 370/412 |
| 6,038,217 A * | 3/2000 | Lyles ........................ 370/233 |
| 6,064,677 A * | 5/2000 | Kappler et al. ......... 370/395.43 |
| 6,081,507 A | 6/2000 | Chao et al. ................. 370/235 |
| 6,128,303 A | 10/2000 | Bergantino et al. ......... 370/398 |
| 6,320,845 B1 | 11/2001 | Davie ........................ 370/230 |
| 6,377,583 B1 * | 4/2002 | Lyles et al. ................. 370/412 |

\* cited by examiner

*Primary Examiner*—John B. Walsh
(74) *Attorney, Agent, or Firm*—Ansel M. Schwartz

(57) ABSTRACT

A technique for controlling a multiplicity of time-sorted queues with a single controller and supporting memory, which may be software-configured so as to allow the use of the controller in an implementation having a multiplicity and variety of output lines or channels. The technique includes receiving a plurality of packets from one or more packet flows at a respective time-based output port queue of the network switch, in which each packet has a timestamp associated therewith. Each output card memory can be divided into a plurality of queues, in which the number of queues corresponds to the number of flows received by the switch and the size of each queue is proportional to the fractional amount of the total bandwidth of the switch used by the corresponding packet flow.

12 Claims, 8 Drawing Sheets

```
//RAM1 = First Level Acceleration Bit-string Memory
//RAM2 = Second Level Acceleration Bit-string Memory
//RAM3 = Third Level Acceleration Bit-string Memory
//ARRAY = Linear Time-Indexed Array
//T = Timestamp Value
//T = T1||T2||T3||TA
// where     T1 = First Timestamp Value Sub-field
//          T2 = Second Timestamp Value Sub-field
//          T3 = Third Timestamp Value Sub-field
//          TA = Fourth Timestamp Value Sub-field
// P = Packet Descriptor
ARRAY[T] <— P     //Timeslot is marked "Used" (Used=1).
RAM1<T1> <— 1
RAM2[T1]<T2> <— 1
RAM3[T1||T2]<T3> <— 1
```

*Fig. 8*

```
//x1 = First Level Priority-encoded Acceleration
//Bit-string
//x2 = Second Level Priority-encoded Acceleration
//Bit-string
//x3 = Third Level Priority-encoded Acceleration
//Bit-string
x1 <— PRI(RAM1)
x2 <— PRI(RAM2[x1])
x3 <— PRI(RAM3[x1||x2])
X <— x1||x2||x3
//Read N entries of ARRAY starting with ARRAY[X].
P <— ARRAY[K]    //K = the index of the first "Used"
                 //ARRAY entry read. Timeslot is
                 //marked "Unused" (Used=0).
RAM3[x1||x2]<x3> <— 0   //In the event all ARRAY[X]
                        //through ARRAY[X+N-1] are
                        //now Unused.
RAM2[x1]<x2> <— 0       //In the event RAM3[x1||x2] = 0.
RAM1<x1> <— 0           //In the event RAM2[x1] = 0.
```

*Fig. 9*

OPERATION OF A MULTIPLICITY OF TIME SORTED QUEUES WITH REDUCED MEMORY

CROSS REFERENCE TO RELATED APPLICATIONS

This application claims priority of U.S. Provisional Patent Application No. 60/264,095 filed Jan. 25, 2001 entitled OPERATION OF A MULTIPLICITY OF TIME SORTED QUEUES WITH REDUCED MEMORY.

STATEMENT REGARDING FEDERALLY SPONSORED RESEARCH OR DEVELOPMENT

N/A

BACKGROUND OF THE INVENTION

The present invention relates generally to communications systems, and more specifically to a technique for managing a multiplicity of time-based queues at an output port of a node in a communications network.

A conventional communications system includes a plurality of nodes interconnected by a plurality of data transmission paths to form at least one communications network. The plurality of nodes includes at least one node configurable as an ingress node for originating a data path and at least one node configurable as an egress node for terminating a data path through the network. Each node on the network typically comprises a network switch that can be used to interconnect two or more of the plurality of data paths. Each switch includes at least one input port and at least one output port coupled to respective data paths and is typically configured to allow each output port to receive digital data in the form of, e.g., packets from any input port. The switch determines the appropriate output port for a particular packet by accessing information contained in a header field of the packet.

In the conventional communications system, a Class of Services (CoS) contract is typically formed between an operator of the communications network and a user of the network that specifies the user's parameters for transmitting data over the network. For example, the CoS contract may specify the user's bandwidth for transmitting packets over the network. Further, because each output port of a network switch may receive packets from any input port of the switch, each output port typically includes one or more queues configured to buffer at least one user's packet flow for a particular class of service. The switch typically determines the required class of service for each packet in the flow by accessing information contained in the packet header field.

The network switch typically employs a scheduling algorithm for determining the order in which the packets are to be transmitted from the output port queue(s). For example, each output port may comprise a respective time-sorted queue for each packet flow. Further, the switch may employ a Weighted-Fair Queuing (WFQ) scheduling algorithm operative to determine the order in which the packets are to be transmitted from the time-sorted queues. The WFQ scheduling algorithm may compute a timestamp having a value corresponding to some virtual or actual time for the packet at the head of each queue. Next, the WFQ scheduling algorithm may determine which head-of-line packet has the timestamp with the lowest value, and then select the corresponding queue as the next queue from which to transmit a packet. The WFQ scheduling algorithm allows the switch to set parameters to guarantee the particular class of service for each packet flow.

The network switch may alternatively employ a scheduling algorithm based on a binary tree of comparators to determine the next packet to be transmitted from the output port queue(s). However, like the WFQ scheduling algorithm, the scheduling algorithm based on the binary tree of comparators can typically only be used to manage a limited number of packet flows. For example, a binary tree of N-1 comparators may have $\log_2 N$ levels, in which N is the number of queued flows. Such a tree can become very large and costly to implement as the number of packet flows increases. Further, the time required by such a binary tree of comparators is typically proportional to $\log_2 N$ or worse, which makes this approach unacceptable as N gets large.

Typically, each output port of the switch has a large aggregate "bandwidth" (i.e., the capacity to transfer data per unit of time) and each output line card implements encapsulating the packets into one or more of the various logical and physical data transmission types (e.g., SONET OC-48 POS, SONET OC-3 POS, DS-3, Gigabit Ethernet, SONET OC-48 ATM, etc.). Each output line card may be configured to have a multiplicity of outputs whose aggregate capacity is equal to the capacity of the switch output coming into the card. For example, if the capacity of the switch output is approximately $2.4 \times 10^9$ bits/sec (approximately that of SONET OC-48), then one configuration of an output line card may have four (4) ports of $600 \times 10^6$ bits/sec and another configuration may have sixteen (16) ports of $150 \times 10^6$ bits/sec. Both configurations would make good economic use of the switch output.

Because a number of types of output line cards may be designed, it would be desirable to have as much of the design as possible in common. Specifically, it would be desirable to have the implementation of the WFQ scheduling algorithm be software configurable to handle any combination of packet encapsulation and physical layer types. Further, the enqueuing and dequeuing of packets into the time-sorted queues should be done at a fast enough rate for transferring minimum size packets at full output line data rate capacity using current technology.

BRIEF SUMMARY OF THE INVENTION

In accordance with the present invention, a technique for scheduling the transmission of packets from one or more output port queues of a network switch is disclosed that can handle a large number of packet flows. Benefits of the presently disclosed scheduling technique are achieved by providing a memory at each output port of the network switch, the memory comprising at least one time-based queue, generating one or more acceleration bit-strings for use in identifying the packet in the time-based queue having an associated timestamp with the lowest value, and scheduling that packet as the next packet to be transmitted over the network. A single time-based queue can buffer packets corresponding to one or more packet flows associated with a single channel in the network. Alternatively, the memory can be divided into a plurality of time-based queues to manage the transmission of packet flows associated with a corresponding plurality of channels in the network.

In one embodiment, the scheduling technique includes receiving a plurality of packets from one or more packet flows at a respective time-based output port queue of the network switch, in which each packet has a timestamp associated therewith. Next, each packet is inserted into a respective timeslot of the output port queue, as indexed by its associated timestamp. The binary value of the timestamp is then partitioned into a plurality of sub-fields, each sub-field comprising one or more bits and corresponding to a predetermined level of acceleration bit-strings. The sub-fields of bits are used to index respective locations in at least one memory, and the values at these respective locations are subsequently asserted to generate the acceleration bit-strings. Specifically, the value at a respective location in a first memory configured to store a first level of acceleration bit-strings is asserted, as indexed by a first sub-field of bits; the value at a respective location in a second memory configured to store a second level of acceleration bit-strings is asserted, as indexed by a combination of the first sub-field and a second sub-field of bits; the value at a respective location in a third memory configured to store a third level of acceleration bit-strings is asserted, as indexed by a combination of the first and second sub-fields and a third sub-field of bits, and so on for each level of acceleration bit-strings.

In order to dequeue a packet, priority encoding is then successively performed for each level of acceleration bit-strings to determine the respective timeslot of the time-based queue containing the packet with the lowest-valued timestamp. To that end, priority encoding is performed on the first level acceleration bit-string stored in the first memory to obtain a first level priority-encoded acceleration bit-string, priority encoding is performed on the second level acceleration bit-string stored in the second memory to obtain a second level priority-encoded acceleration bit-string, priority encoding is performed on the third level acceleration bit-string stored in the third memory to obtain a third level priority-encoded acceleration bit-string, and so on for each level of acceleration bit-strings. During the above-mentioned priority encoding, each stage's memory is indexed by a concatenation of the prior stages' priority-encoded outputs. Next, the first, second, and third level priority-encoded acceleration bit-strings are concatenated and used to index the output port queue to identify the packet in the queue having the timestamp with the lowest value. The identified packet is then extracted from the output port queue and transmitted over the network.

In the presently disclosed embodiment, each output line card includes a memory having a size that is sufficient to support up to the total bandwidth of the network switch, which may receive packets from a plurality of flows conforming to different bandwidth requirements. The output card memory can be divided into a plurality of time-based queues, in which the number of queues corresponds to the number of channels handled by the card, each channel having one or more flows associated therewith. Further, the size of each queue is proportional to the fractional amount of the total bandwidth of the card used by the corresponding channel. The presently disclosed technique can be employed to manage the insertion and extraction of packets into and out of the respective queues. By dividing the output card memory into a plurality of time-based queues to manage the transmission of packet flows associated with a plurality of channels in the network, memory requirements of the network switch are reduced.

Other features, functions, and aspects of the invention will be evident to those of ordinary skill in the art from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 8 depicts a pseudo code representation of a method of inserting at least one packet descriptor into a respective timeslot of the time-based queue of FIG. 4 and generating a plurality of acceleration bit-strings corresponding thereto for storage in the acceleration bit-string memory of FIG. 4; and FIG. 9 depicts a pseudo code representation of a method of priority encoding the plurality of acceleration bit-strings of FIG. 8 and using the priority-encoded bit-strings to extract the packet descriptor of FIG. 8 having the lowest-valued timestamp for subsequent transmission over a network.

DETAILED DESCRIPTION OF THE INVENTION

U.S. Provisional Patent Application No. 60/264,095 filed Jan. 25, 2001 is incorporated herein by reference.

A method for scheduling the transmission of data units from one or more output port queues of a network switch is provided that can be used to manage a large number of data flows through the switch. The presently disclosed scheduling technique divides an output line card memory into a plurality of time-based queues to manage the transmission of data flows associated with a plurality of channels in the network. The presently disclosed technique further employs one or more acceleration bit-strings to identify the data unit in the time-based queue having an associated timestamp with the lowest value, and schedules the identified data unit as the next data unit to be transmitted over the network.

Figure 1:
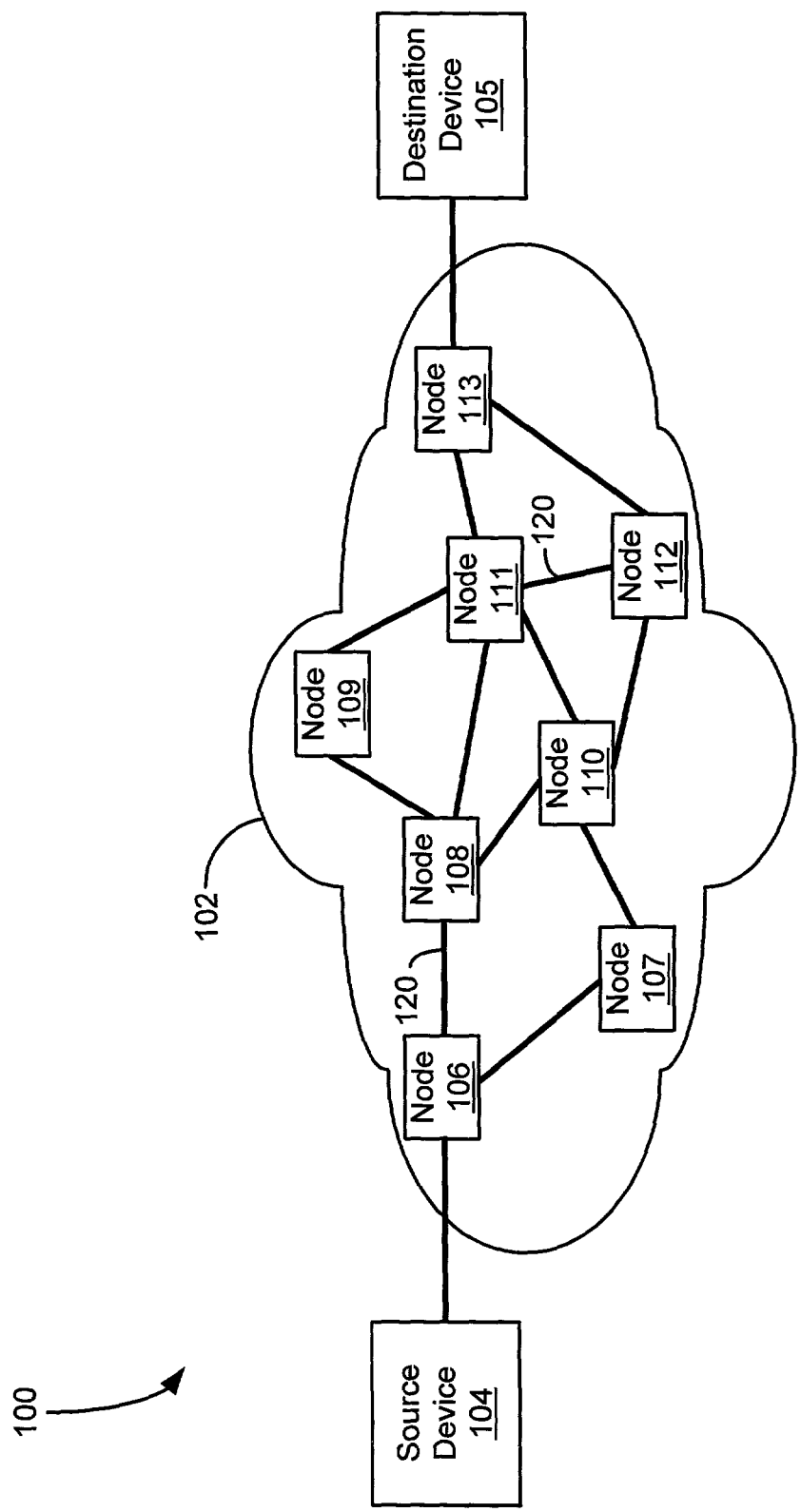
FIG. 1 depicts a block diagram of a communications system including at least one node configured according to the present invention.

FIG. 1 depicts an illustrative embodiment of a communications system 100 comprising a communications network 102 that includes at least one node configured to schedule the transmission of data units over the network 102, in accordance with the present invention. For example, the network 102 may comprise a packet switched communications network. In the illustrated embodiment, the network 102 comprises a plurality of nodes 106-113 interconnected by a plurality of data transmission paths 120. The plurality of nodes 106-113 includes at least one ingress node configured to originate a data path and at least one egress node configured to terminate a data path through the network 102. For example, the network 102 may be configured to establish one or more packet flows for a plurality of packets transmitted from a source device 104 coupled to the network 102 at the ingress node 106 to a destination device 105 coupled to the network 102 at the egress node 113. Accordingly, the node 106 may be configured as the ingress node and the node 113 may be configured as the egress node for transmitting packets from the source device 104 to the destination device 105 via a plurality of data paths 120 traversing at least a portion of the intermediate nodes 107-112.

For example, each of the nodes 106-113 on the network 102 may comprise a router or a network switch. Further, each of the devices 104-105 may comprise a client, a server, or a gateway to another network. Moreover, the network 102 may comprise a Local Area Network (LAN), a Wide Area Network (WAN), a global computer network such as the Internet, or any other network configured to communicably couple the devices 104-105 to one another.

Those of ordinary skill in the art will appreciate that a Class of Services (CoS) contract may be formed between an operator of a communications network and a user of the network specifying the user's parameters for transmitting data on the network. For example, the user of the network 102 may be a user of the device 104 coupled to the network 102 at the node 106, and the CoS contract may specify that user's bandwidth for transmitting packets over the network 102. Accordingly, the user of the device 104 may transmit packets at or below the data transmission rate(s) specified in the CoS contract or in bursts so long as the bandwidth requirements of the CoS contract are not exceeded over time.

Figure 2:
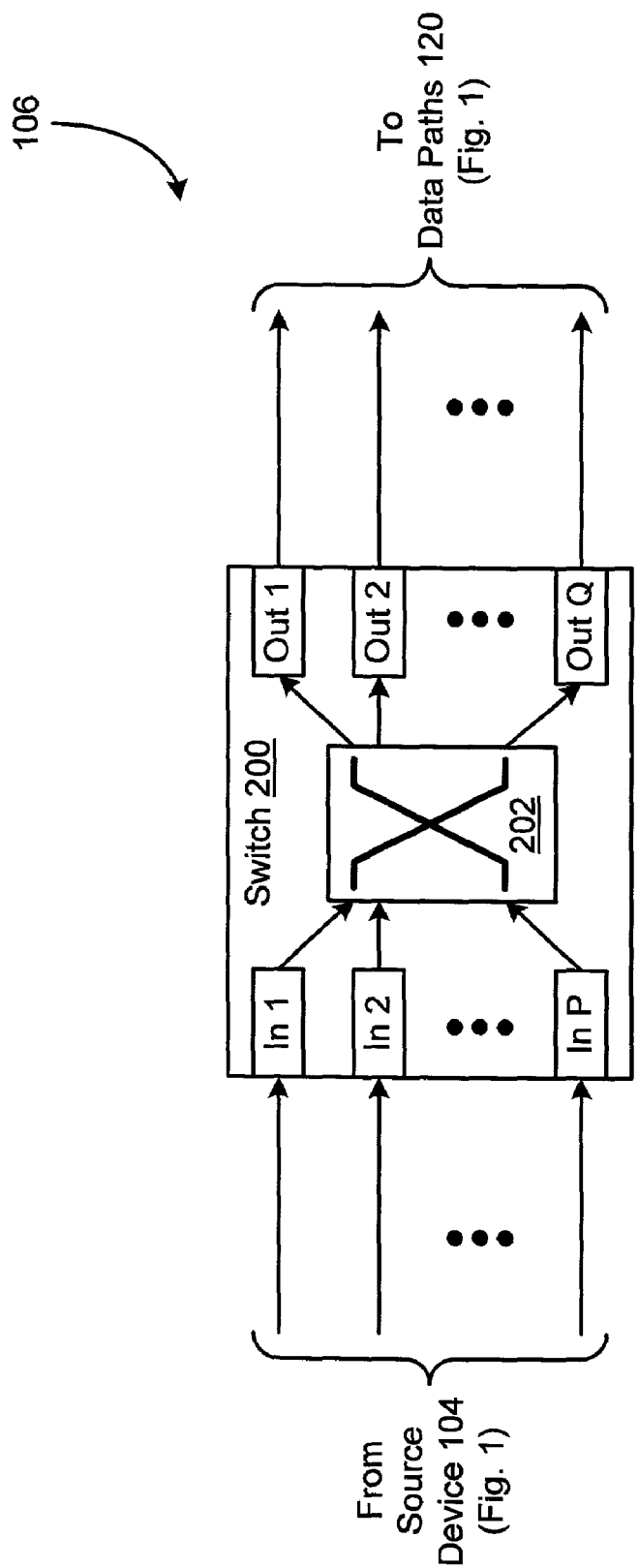
FIG. 2 depicts a block diagram of an illustrative embodiment of a network switch constituting the node of FIG. 1.

FIG. 2 depicts an illustrative embodiment of the node 106 on the communications network 102 (see FIG. 1). Because the nodes 106-113 are similarly configured to transmit packets over the network 102 from the source device 104 to the destination device 105 via the data paths 120, each of the nodes 107-113 may be configured like the node 106, as depicted in FIG. 2.

In the illustrated embodiment, the node 106 comprises a network switch 200, which includes one or more input ports 1-P communicably coupled to the device 104 and one or more output line cards 1-Q, each card having one or more output ports communicably coupled to respective data paths 120 in the network 102 (see FIG. 1). For example, the switch 200 may comprise an IP-centric switch configured to run a protocol package such as TCP/IP for implementing data communications between the nodes 106-113. The switch 200 further includes a cross-connect 202 configured to allow each of the output cards 1-Q to receive digital data in the form of, e.g., packets from any one of the input ports 1-P. For example, the switch 200 may determine the appropriate output port(s) for a particular packet by accessing information contained in a header field of the packet. Because the respective output cards 1-Q may receive packets from any one of the input ports 1-P, each card includes a memory 700 (see FIG. 7) comprising at least one time-based queue configured to buffer data corresponding to at least one packet flow for a particular class of service.

Figure 3:
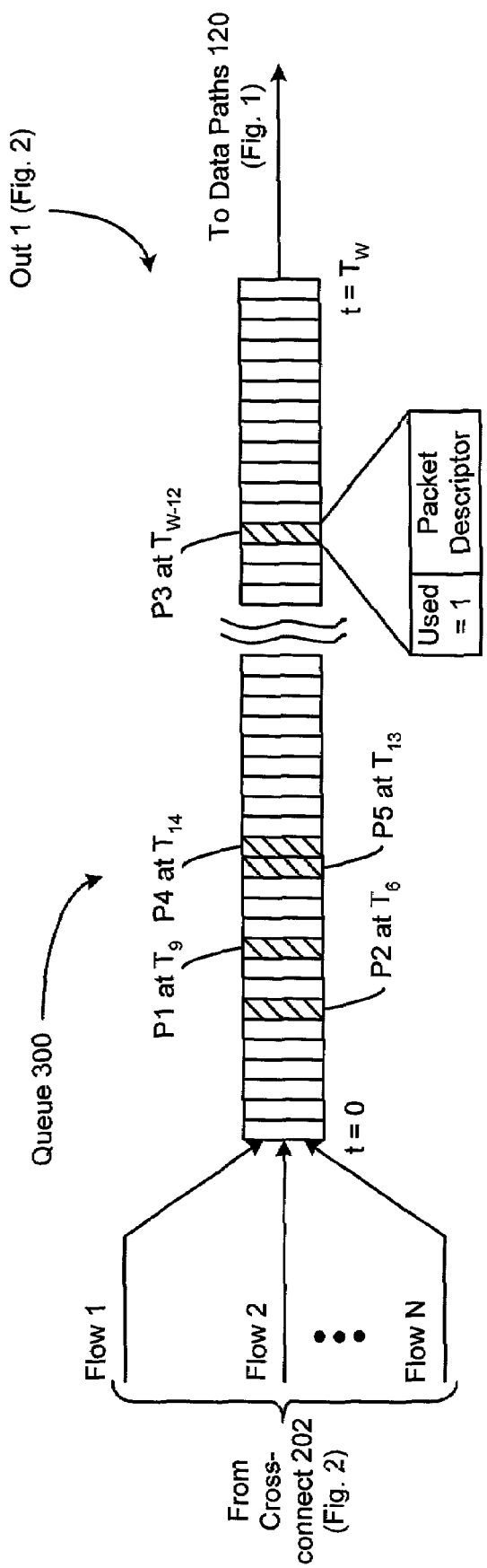
FIG. 3 depicts a conceptual representation of a time-based queue included in an output line card of the switch of FIG. 2.

FIG. 3 depicts a conceptual representation of a time-based queue 300 included in the memory of the output card 1 of the network switch 200 (see FIG. 2). It should be understood that each of the output cards 1-Q of the switch 200 includes a respective memory comprising one or more time-based queues like the time-based queue 300. In the illustrated embodiment, the time-based queue 300 comprises a linear time-indexed array configured to buffer packet data from a plurality of packet flows 1-N provided to the queue 300 by the cross-connect 202 (see FIG. 2). For example, the plurality of packet flows 1-N may be associated with a respective channel between the device 104 and the node 106.

As shown in FIG. 3, the time-based queue 300 includes a plurality of storage locations, each location corresponding to a respective timeslot within a time window ranging from t=0 to t=$T_W$. For example, the time window for a linear time-indexed array employed in an IP-centric network switch may have a duration of about 500 msecs (i.e., the time window may range from t=0 to about t=$T_W$=500 msecs). It is noted that IP-packets are normally not held in such arrays for much longer than about 100 msecs, after which TCP retransmissions of the packets are likely to occur. Each packet provided to the output card 1 by the cross-connect 202 comprises a data structure including a packet buffer, an associated packet descriptor including a pointer to the packet buffer, and an associated timestamp value corresponding to some virtual or actual time. For example, the switch 200 may employ an algorithm such as a Weighted-Fair Queuing (WFQ) scheduling algorithm or any other suitable algorithm for computing each respective timestamp value upon arrival of the packet at the switch 200. Further, each timestamp value may have a granularity on the order of a minimum packet size, e.g., 64 or 128 bytes.

In the illustrated embodiment, the network switch 200 (see FIG. 2) is configured to insert each packet descriptor into a respective timeslot of the time-based queue 300 (see FIG. 3), as indexed by the packet's associated timestamp value. For example, FIG. 3 shows packet descriptor P1 being inserted into the timeslot at t=$T_9$, packet descriptor P2 being inserted into the timeslot at t=$T_6$, packet descriptor P3 being inserted into the timeslot at t=$T_{W-12}$, packet descriptor P4 being inserted into the timeslot at t=$T_{14}$, and packet descriptor P5 being inserted into the timeslot at t=$T_{13}$. Further, each respective timeslot has a 1-bit "Used" variable associated therewith, which is asserted by the switch 200 to indicate whether the respective timeslot contains a valid packet descriptor. It is understood that alternative techniques may be employed to indicate that a respective timeslot contains a packet descriptor. The switch 200 is further configured for periodically extracting the packet descriptor having the lowest timestamp value from the time-based queue 300, and transmitting the packet associated therewith over the network 102 via the data paths 120 (see FIG. 1).

Figure 4:
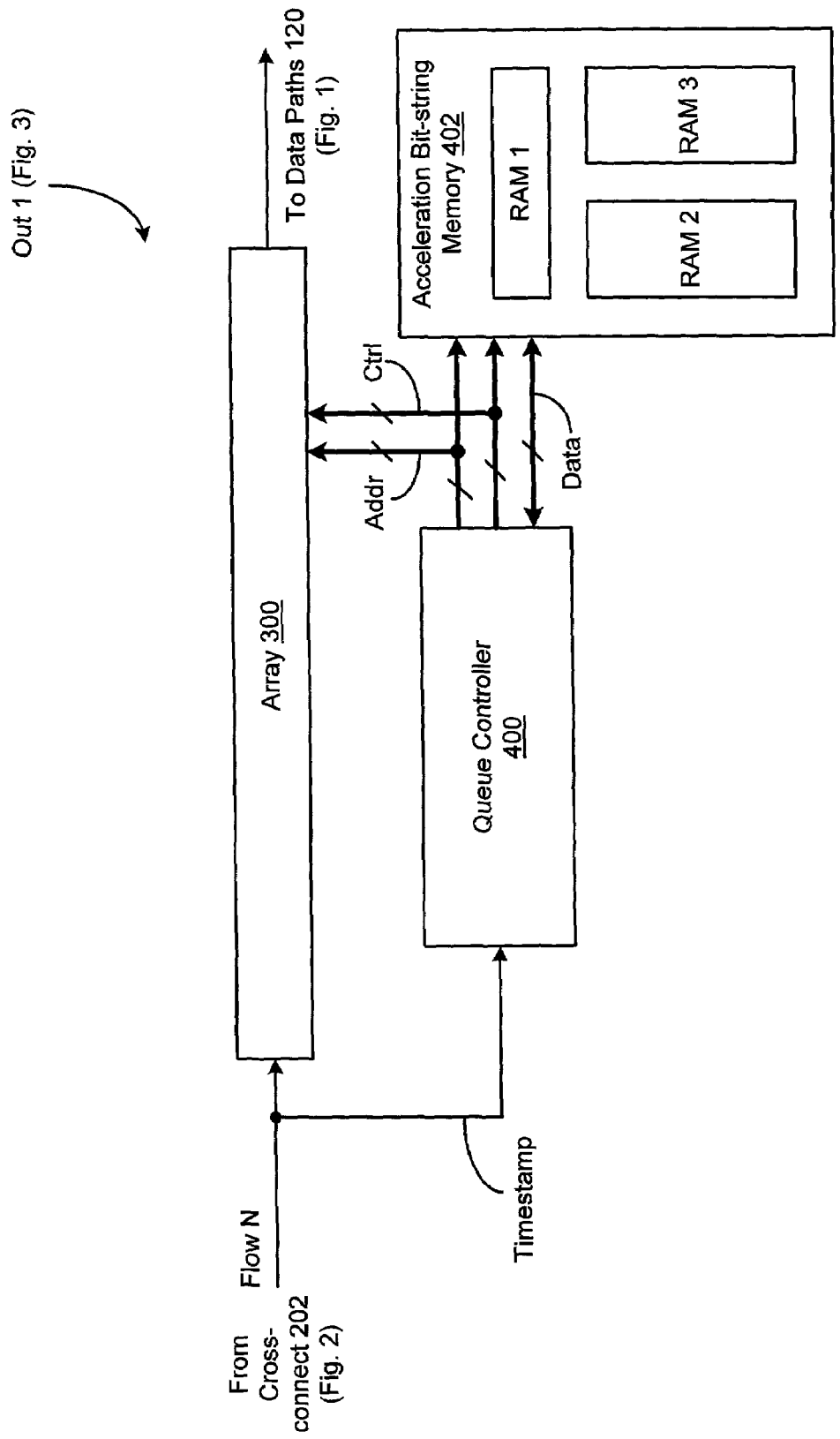
FIG. 4 depicts a block diagram of an illustrative embodiment of the output line card of FIG. 3 including the time-based queue, a queue controller, and a first memory for storing acceleration bit-strings.

FIG. 4 depicts an illustrative embodiment of the output card 1 included in the network switch 200 (see FIG. 2). In the illustrated embodiment, the output card 1 includes the memory comprising the time-based queue (specifically, the linear time-indexed array 300), a queue controller 400, and an acceleration bit-string memory 402. The queue controller 400 is configured to control the insertion and extraction of packet descriptors into and out of the linear time-indexed array 300. Further, the acceleration bit-string memory 402 is configured to store one or more acceleration bit-strings, which are generated and subsequently used by the queue controller 400 to identify the packet descriptor in the array 300 with the lowest timestamp value.

For example, the network 102 (see FIG. 1) may comprise a fiber optic network conforming to the Synchronous Optical NETwork (SONET) standard. For such a network operating at Optical Carrier speeds ranging from, e.g., OC-3 (155.52 Mbps) to OC-12 (622.08 Mbps), the queue controller 400 may be configured to use three levels of acceleration bit-strings to identify the packet descriptor in the linear time-indexed array 300 with the lowest-valued timestamp. Further, the linear time-indexed array 300 may be configured to include 1-4 million entries of, e.g., 16 or 32-bits bits each to store the packet descriptors. It is understood that such a fiber optic network is merely exemplary and that the presently disclosed scheduling technique may be employed with any suitable network configuration.

In the illustrated embodiment, the acceleration bit-string memory 402 (see FIG. 4) includes three Random Access Memories (RAMs) 1-3 configured to store first, second, and third levels of acceleration bit-strings, respectively. For example, the RAM 1 may comprise a register having a suitable width for storing the first level of acceleration bit-strings, and the RAMs 2-3 may comprise memories of suitable size for storing the second and third levels of acceleration bit-strings, respectively.

An illustrative method of inserting at least one packet descriptor into a respective timeslot of the linear time-indexed array 300 and generating a plurality of acceleration bit-strings corresponding thereto for storage in the acceleration bit-string memory 402 is represented in pseudo code in FIG. 8, in which A[k] denotes an illustrative array A indexed by an integer k, the result being a bit-string having a width equal to that of A's respective entries, B<p> denotes the $p^{th}$ bit of an illustrative bit-string B, C| |D denotes an illustrative bit-string C concatenated with an illustrative bit-string D, C being the higher-order bits if the result is interpreted as an integer, E←F denotes an illustrative element E being set to an illustrative value F, and "1" is a numeric literal value of appropriate bit-string length.

Accordingly, when a packet descriptor P having a timestamp value T associated therewith is received at the output card 1 (see FIGS. 3-4), T is provided to the queue controller 400, which partitions T into a plurality of sub-fields $T_1$, $T_2$, and $T_3$ corresponding to the first, second, and third level acceleration bit-strings and a sub-field $T_A$ indexing one of several timeslots in the array 300. P is then inserted into the array 300, as indexed by T. Next, the $T_1^{st}$ bit of a first level acceleration bit-string RAM1 is asserted, the $T_2^{nd}$ bit of a second level acceleration bit-string RAM2[$T_1$] is asserted, and the $T_3^{rd}$ bit of a third level acceleration bit-string RAM3 [$T_1$| |$T_2$] is asserted. It is noted that the insertion of P into the linear time-indexed array 300 and the assertion of the respective bits in the first, second, and third level acceleration bit-strings are controlled by the queue controller 400 via the Addr, Ctrl, and Data lines (see FIG. 4).

An illustrative method of priority encoding the first, second, and third level acceleration bit-strings stored in the acceleration bit-string memory 402 and extracting the packet descriptor of the next packet having the lowest-valued timestamp from the linear time-indexed array 300 for subsequent transmission over the network is represented in pseudo code in FIG. 9, in which the word width of RAM1-RAM3 (see FIG. 4) may be equal to 64 or 128, and PRI(G) denotes priority encoding of an illustrative bit-string G. In the presently disclosed embodiment, PRI(G) implements a "low-wins" priority encoding technique that returns the bit index of the least-significant (i.e., lowest-numbered) "1" bit in the bit-string G.

Figure 5:
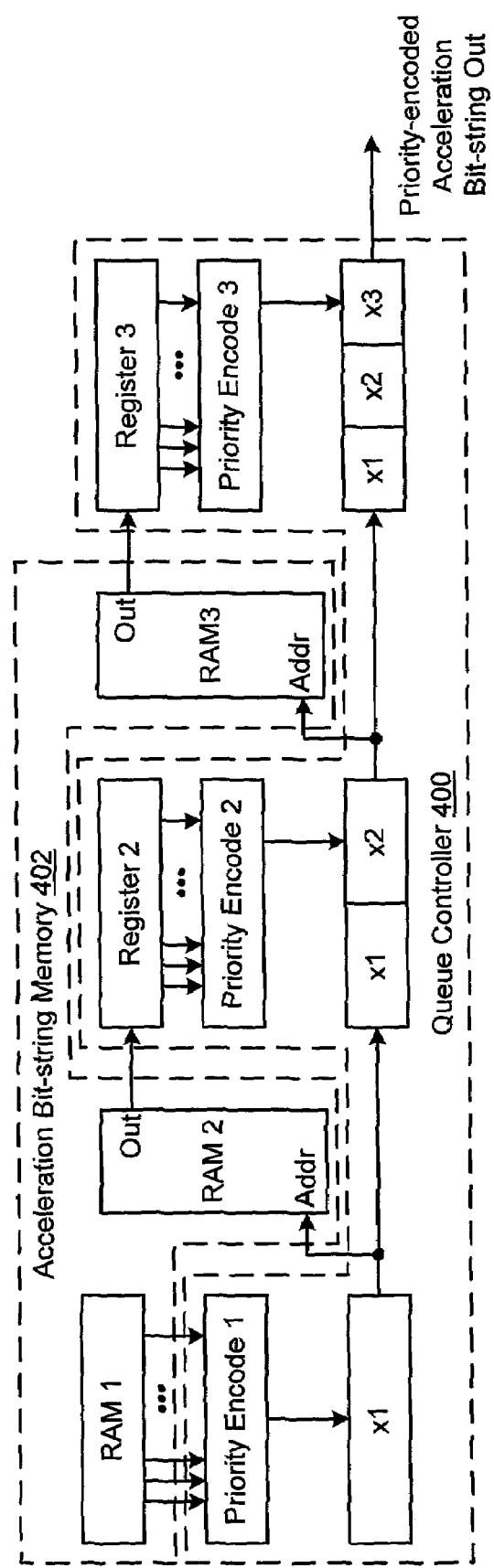
FIG. 5 depicts a block diagram of the queue controller and acceleration bit-string memory of FIG. 4 performing priority encoding.

FIG. 5 depicts a block diagram of the queue controller 400 performing the illustrative priority encoding method of FIG. 9 using the acceleration bit-string memory 402 (see FIG. 4). In the illustrated embodiment, the RAM 1 provides the first level acceleration bit-string to a Priority Encoder 1, which performs priority encoding on the bit-string to obtain x1. Next, x1 is employed as an address to access the second level acceleration bit-string RAM2[x1] from the RAM 2, which provides RAM2[x1] to a Register 2. The Register 2 then provides the second level acceleration bit-string RAM2[x1] to a Priority Encoder 2, which performs priority encoding on the bit-string to obtain x2. Next, x1 and x2 are concatenated and employed as an address to access the third level acceleration bit-string RAM3[x1| |x2] from the RAM 3, which provides RAM3[x1| |x2] to a Register 3. The Register 3 then provides the third level acceleration bit-string RAM3[x1| |x2] to a Priority Encoder 3, which performs priority encoding on the bit-string to obtain x3. Next, x1, x2, and x3 are concatenated to form a priority-encoded acceleration bit-string for indexing the linear time-indexed array 300 to identify the packet descriptor P having the timestamp with the lowest value.

The identified packet descriptor P is then extracted from the linear time-indexed array 300 and the corresponding packet is scheduled as the next packet to be transmitted over the network. In the event all of the entries of the array 300 indexed from X to X+N−1 are now marked as unused, the $x3^{rd}$ bit of the third level acceleration bit-string RAM3[x1| |x2] is de-asserted. Further, in the event RAM3[x1| |x2]=0, the $x2^{nd}$ bit of the second level acceleration bit-string RAM2[x1] is de-asserted. Moreover, in the event RAM2[x1]=0, the $x1^{st}$ bit of the first level acceleration bit-string RAM1 is de-asserted. It is noted that the priority encoding of the first, second, and third level acceleration it-strings stored in the acceleration bit-string memory 402 and the extracting of the packet descriptor with the lowest-valued timestamp from the linear time-indexed array 300 are controlled by the queue controller 400.

It is further noted that the above-described packet descriptor inserting method could potentially insert a plurality of packet descriptors, each packet descriptor having the same timestamp value, into the same timeslot of the array 300. As a result, there may be a "collision" of packet descriptors at that timeslot of the array 300.

For this reason, the bit-string ARRAY[T] is read before inserting P into that bit-string location to determine whether the corresponding Used variable is asserted, thereby indicating that the bit-string ARRAY[T] contains a packet descriptor. In the presently disclosed embodiment, a linked list of colliding packet descriptors is chained to each timeslot of the linear time-indexed array 300 to resolve potential collisions of packet descriptors. In an alternative embodiment, the array 300 may provide a plurality of enqueued packets (e.g., 2 or 4) for each timestamp value.

In the event a linked list of packet descriptors is employed for collision resolution, the packets may be removed in any order since they are from separate data flows if they have the same timestamp. It is noted that this timeslot is considered "used" so long as the linked list pointed to by the timeslot contains at least one packet descriptor. A timeslot is considered "used" so long as at least one packet for the timestamp contains a packet descriptor.

Figure 6A:
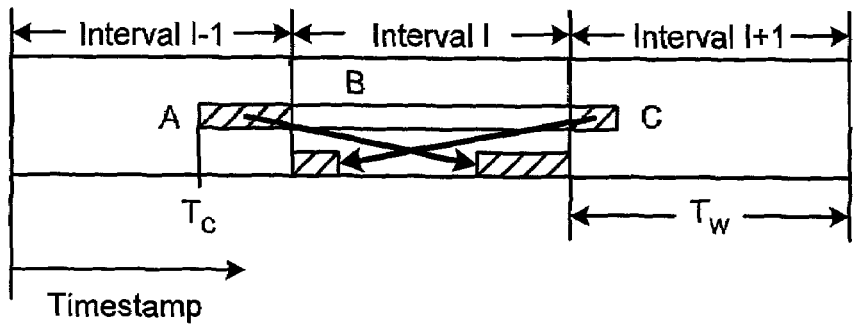
FIGS. 6a-6c are diagrams depicting a technique for preventing timestamp uncertainty across a plurality of consecutive time intervals.

In the presently disclosed embodiment, the number space employed by the timestamp values is circular, which may cause some uncertainty as to whether a particular timestamp value T belongs to a current time interval "I" (in which I counts increments of the time window ranging from t=0 to t=$T_W$), a past time interval "I−1", or a future time interval "I+1". FIG. 6a depicts the above-mentioned time intervals I−1, I, and I+1. For example, a time window greater than $T_W$ spanning rectangles A, B, and C may represent the range of timestamp values in use at a particular instant of time. Further, a current virtual time may be indicated at $T_C$, which corresponds to the timestamp of the last packet descriptor extracted from the linear time-indexed array 300 (see FIG. 3). As shown in FIG. 6a, the ranges of timestamp values represented by the rectangles A and C within the time intervals I−1 and I+1, respectively, get effectively re-mapped over the time interval I containing the rectangle B. Specifically, the timestamp values corresponding to the rectangle A get re-mapped late in time interval I, and the timestamp values corresponding to the rectangle C get re-mapped early in time interval I. As a result, any packets having timestamp values within the ranges represented by the rectangles A and C may be transmitted over the network in the wrong order.

Figure 6B:
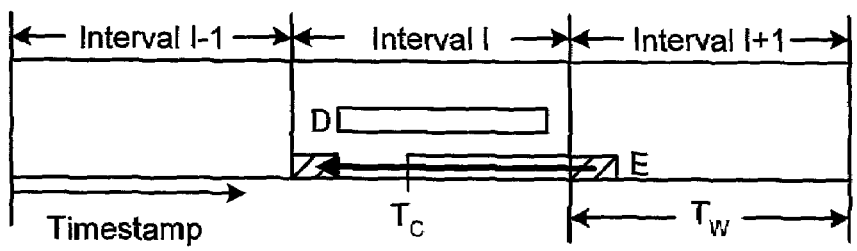

As shown in FIG. 6b, the range of usable timestamp values may alternatively be represented by a rectangle D, which limits the timestamp value range to less than $T_W$. Further, the current virtual time may be indicated at $T_C$. However, even though the range of timestamp values is now less than $T_W$, the range of timestamp values represented by the rectangle E within the time interval I+1 gets effectively re-mapped over the time interval I containing the rectangle D. Specifically, the timestamp values corresponding to the rectangle E get re-mapped early in time interval I. As a result, any packets having timestamp values within the range represented by the rectangle E may be transmitted over the network in the wrong order.

In the presently disclosed embodiment, the above-described timestamp value uncertainty is resolved by limiting the range of timestamp values to $T_W/2$. As shown in the top diagram of FIG. 6c, ranges of usable timestamp values are represented by rectangles F, G, and H (each of which represent a timestamp value range of $T_W/2$ or less). Although no re-mapping occurs for the timestamp values represented by the rectangles F and G, a portion of the range of timestamp values represented by the rectangle H within the time interval I+1 gets re-mapped early in time interval I.

Figure 6C:
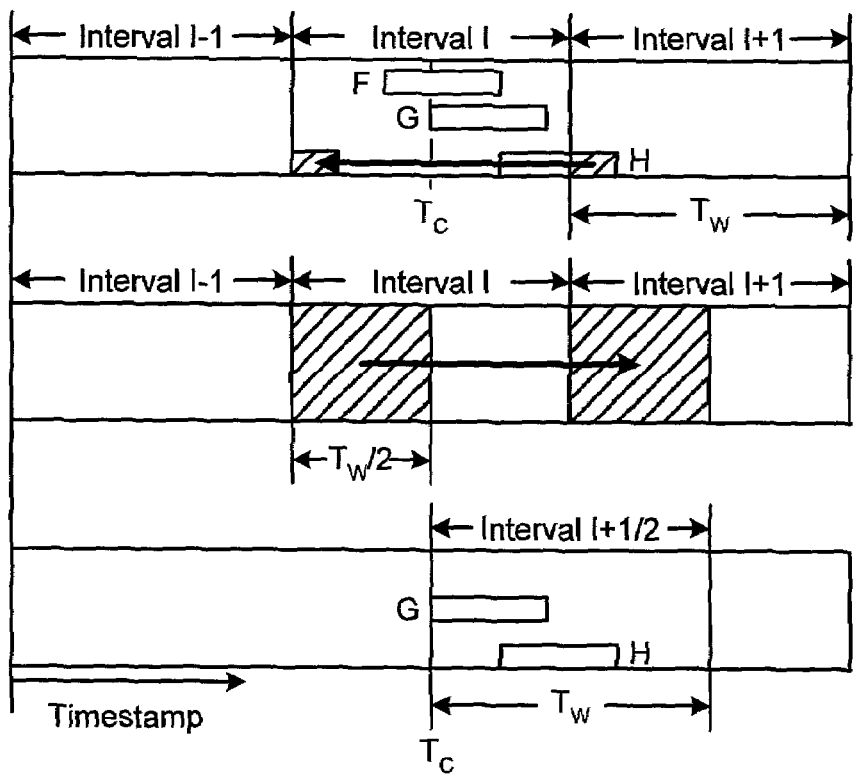

As further shown in the top diagram of FIG. 6c, when the current virtual time $T_C$ reaches $T_W/2$ within the interval I (i.e., when $T_C \geq T_W/2$, at which point the value of the Most Significant Bit (MSB) or the "sign bit" changes from logical 0 to 1), the first half of the timestamp number space within each of the intervals I and I+1 is empty. This means that the first half of the time interval I can conceptually be employed as the first half of the time interval I+1, as shown in the middle diagram of FIG. 6c in which the time interval I is effectively shifted forward in time by $T_W/2$ to yield the new time interval I+½ (see also the bottom diagram of FIG. 6c). As a result, the range of timestamp values represented by the rectangle H is now completely within the time interval I+½, and any re-mapping of these timestamp values is prevented.

For example, the above-described shifting of the time interval I, as shown in FIG. 6c, may be implemented by replacing the first line of pseudo code in the priority encoding method of FIG. 9 (i.e., "x1←PRI(RAM1)") with the pseudo code

```
// S=Shift State (the sign bit of T_C)
if S=1
    then x1←PRI(SWAP(RAM1))+(SIZEOF(RAM1)/2)
else
    x1←PRI(RAM1)
``` and adding the pseudo code

```
if ((S=0) AND (SIGN(PRI(RAM1))=1))
    then S←1
else if ((S=1) AND (SIGN(PRI(SWAP(RAM1)))=0)
    then S←0
``` after the last line of pseudo code of FIG. 9 (i.e., RAM1<x1>←0), in which SWAP(J) returns Jl| |Jh, Jl being the lower half of an illustrative bit-string J and Jh being the upper half of the bit-string J, SIZEOF(K) returns the number of bits in an illustrative bit-string K, and SIGN(L) returns the sign bit of an illustrative bit-string L.

In the illustrated embodiment, the memory of the output card 1 of the network switch 200 (see FIG. 2) has a size that is sufficient to support the total bandwidth of the output of the cross-connect 202 coming into the card, which may provide packets from a plurality of packet flows associated with a respective channel in the network. In the event the switch 200 receives packets from a plurality of packet flows associated with a multiplicity of channels, the output card memory is configured to include a plurality of time-based queues, in which the number of queues corresponds to the number of channels handled by the card. Further, in this embodiment, the size of each time-based queue is proportional to the fractional amount of the total bandwidth capacity used by the corresponding channel.

Figure 7:
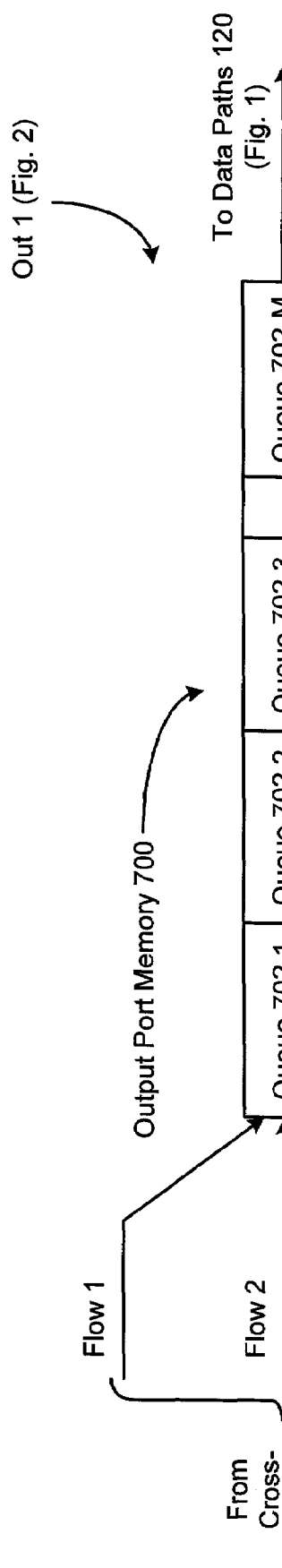
FIG. 7 depicts a second memory of the output line card of FIG. 3 divided into a plurality of time-based queues.

FIG. 7 depicts the memory 700 of the output card 1, which is configured to include a plurality of time-based queues 702.1-702.M. It is understood that each of the queues 700.1-700.M includes a plurality of storage locations, each location corresponding to a respective timeslot within a time window have a duration of, e.g., 50 msecs for an IP-centric switch. Further, the packet descriptor inserting method of FIG. 8 and priority encoding method of FIG. 9 may be employed to manage the insertion and extraction of packets into and out of the respective queues 700.1-700.M on a per queue basis. It should be appreciated that the configuration of the output card memory 700, as shown in FIG. 7, is merely exemplary and that the memory 700 may include any suitable number of queues conforming to the same or different bandwidth requirements.

The presently disclosed embodiment of the output card memory 700 including the plurality of queues 700.1-700.M will be better understood with reference to the following illustrative example. In this example, each of the queues 700.1-700.11 (M=11) is configured to provide 50 msecs of storage for packets according to the bandwidth requirements of the corresponding channel. Specifically, the queue 700.1 is configured to provide 50 msecs of storage for packets from a corresponding channel conforming to the bandwidth requirements of OC-24. Similarly, the queues 700.2-700.11 are configured to provide 50 msecs of storage for packets from corresponding channels conforming to bandwidth requirements ranging from OC-12 to T-1, respectively. It is noted that such a configuration of the output card memory 700 may be employed in a network switch that supports a total aggregate bandwidth of OC-48.

Further, the RAMs 1-3 of the acceleration bit-string memory 402 (see FIG. 4) are configured as a 1 word×128 bit register, a 128 word×128 bit memory, and a 16,000 word×16 bit memory, respectively, and the linear time-indexed array 300 is configured as a 256,000 word×16 bit queue. When a packet descriptor is inserted into a respective timeslot of the queues 700.1-700.11, the addresses of the respective "Used" bits asserted in the RAMs 1-3 and the memory 700 are determined using

```
used_bit_addr[21:0] =
    { {       ,timestamp[21:0]}&{22{ncb==4'h0}}
    |{channel[10 ],timestamp[20:0]}&{22{ncb==4'h1}}
    |{channel[10:9],timestamp[19:0]}&{22{ncb==4'h2}}
    |{channel[10:8],timestamp[18:0]}&{22{ncb==4'h3}}
    |{channel[10:7],timestamp[17:0]}&{22{ncb==4'h4}}
    |{channel[10:6],timestamp[16:0]}&{22{ncb==4'h5}}
    |{channel[10:5],timestamp[15:0]}&{22{ncb==4'h6}}
    |{channel[10:4],timestamp[14:0]}&{22{ncb==4'h7}}
    |{channel[10:3],timestamp[13:0]}&{22{ncb==4'h8}}
    |{channel[10:2],timestamp[12:0]}&{22{ncb==4'h9}}
    |{channel[10:1],timestamp[11:0]}&{22{ncb==4'hA}}
    |{channel[10:0],timestamp[10:0]}&{22{ncb==4'hB}}
    };
``` in which "|" denotes the logical OR operation, "&" denotes the logical AND operation, "{ . . . }" denotes a vector, "channel[10]-channel[10:0]" correspond to the queues 700.1-700.11, "ncb" is a number-of-channel-bits indication used to control the division of the output card memory 700 into the plurality of queues 700.1-700.11, and "4'h0-4'hB" denote respective 4-bit hexadecimal numbers.

Moreover, acceleration bit-strings are stored in and recovered from the RAMs 1-3 and the memory 700 according to the following TABLE:

TABLE

| ncb | ntsb | RAM1 | RAM2 | RAM3 | MEM700 | bandwidth |
|-----|------|------|------|------|--------|-----------|
| 0   | 22   | 7    | 7    | 4    | 4      | OC-48     |
| 1   | 21   | 6    | 7    | 4    | 4      | OC-24     |
| 2   | 20   | 5    | 7    | 4    | 4      | OC-12     |
| 3   | 19   | 4    | 7    | 4    | 4      | OC-6      |
| 4   | 18   | 3    | 7    | 4    | 4      | OC-3      |
| 5   | 17   | 2    | 7    | 4    | 4      |           |
| 6   | 16   | 1    | 7    | 4    | 4      | DS-3      |
| 7   | 15   | 0    | 7    | 4    | 4      |           |
| 8   | 14   | 0    | 6    | 4    | 4      |           |
| 9   | 13   | 0    | 5    | 4    | 4      |           |
| 10  | 12   | 0    | 4    | 4    | 4      |           |
| 11  | 11   | 0    | 3    | 4    | 4      | T-1       | in which "ntsb" is a number-of-timestamp-bits indication, and the numbers listed under RAM1, RAM2, RAM3, and MEM700 denote the number of bits stored in the respective memories contributing to the formation of the priority-encoded acceleration bit-string used for indexing the queues to identify the packet descriptor P having the timestamp with the lowest value. It is noted that for the total aggregate bandwidth of OC-48, in which ncb=0 and ntsb=22, there are 4+ million (i.e., $2^{22}$) available timestamp values. In contrast, for the slower speed T-1 bandwidth, in which ncb=ntsb=11, there are 2,048 (i.e., $2^{11}$) available timestamp values.

In this example, an exemplary queue corresponding to channel[10:6]=11'b101_0100_0000 is included in the memory 700, in which "11'b101_0100_0000" denotes an 11-bit binary number, ncb=5, and ntsb=17. When a packet descriptor is inserted into a respective timeslot of this queue, a first bit is asserted in the RAM1 at used_bit_addr[21:15], a second bit is asserted in the RAM 2 at used_bit_addr[21:8], a third bit is asserted in the RAM 3 at used_bit_addr[21:4], and a fourth bit is asserted in the memory 700 at used_bit_addr [21:0], in which used_bit_addr[21:0]={channel[10:6],timestamp[16:0]}.

When a packet descriptor is to be extracted from this queue, the $22^{nd}$ group of 4 bits is identified in the RAM 1 (because the five left-most bits of channel[10:6] are "10101" binary, which is 21 decimal). Next, priority encoding is performed on these four bits to obtain the 2-bit contribution of the RAM 1 to the formation of the priority-encoded timestamp[16:0]. This 2-bit contribution is denoted as timestamp[16:15]. Priority encoding is then performed on the 128-bit word stored at the 7-bit address {channel[10:7],timestamp[16:15]} of the RAM 2 to obtain the 7-bit contribution of the RAM 2 to the formation of the timestamp[16:0], which is denoted timestamp[14:8]. Next, priority encoding is performed on the 16-bit word stored at the 14-bit address {channel[10:7],timestamp[16:8]} of the RAM 3 to obtain the 4-bit contribution of the RAM 3 to the formation of the timestamp[16:0], which is denoted timestamp[7:4]. Priority encoding is then performed on the 16-bit word stored at the 18-bit address {channel[10:7], timestamp[16:4]} of the memory 700 to obtain the 4-bit contribution of the memory 700 to the formation of the timestamp [16:0], which is denoted timestamp[3:0]. Next, the bits denoted as timestamp[16:15], timestamp[14:8], timestamp [7:4], and timestamp[3:0] are concatenated to form the timestamp[16:0], which is then used with the channel[10:6] in extracting the packet descriptor from the memory 700 having timestamp with the lowest value. The packet associated with that packet descriptor is then transmitted over the network.

It will further be appreciated by those of ordinary skill in the art that modifications to and variations of the above-described technique for scheduling the transmission of packets from a multiplicity of time-based queues may be made without departing from the inventive concepts disclosed herein. Accordingly, the invention should not be viewed as limited except as by the scope and spirit of the appended claims.

What is claimed is:

1. A method of scheduling the transmission of the at least one data unit from a node on a communications network, the network node including at least one input port communicably coupleable to at least one output port, comprising the steps of:

providing a first memory at each output port of the network node, the first memory comprising at least two linear time-indexed arrays having a plurality of locations, each location corresponding to a respective timeslot within a time window ranging from time t=0 to t=500 msec, at least one of the two linear time-indexed arrays for buffering the at least one data unit;

receiving at least one first data unit at in input port of the network node, the at least one first data unit having an associated timestamp value, a packet buffer, a packet descriptor and a pointer to the packet buffer, the timestamp value having a granularity of about a minimum packet size;

transferring the first data unit from the input port with a cross-connect and inserting the packet descriptor into the respective timeslot;

inserting the first data unit into a respective location of the time-based array based on the associated timestamp value;

indicating with a variable there is a valid data unit in the respective location;

partitioning a binary value of the timestamp associated with the first data unit into a plurality of sub-fields, each sub-field comprising one or more bits, and using the plurality of sub-fields to generate a corresponding plurality of acceleration bit-strings for use in identifying the first data unit in the time-based array having a lowest associated timestamp value;

extracting the identified first data unit having the lowest associated timestamp value from the time-based array; and designating the extracted first data unit as a next data unit to be transmitted over the network.

2. The method of claim 1 wherein the network node includes at least one second memory and the partitioning step includes using the sub-fields of bits to index respective locations in the at least one second memory and asserting values at the respective memory locations to generate the plurality of acceleration bit-strings.

3. The method of claim 2 further including the step of priority encoding each acceleration bit-string to obtain a corresponding priority-encoded acceleration bit-string.

4. The method of claim 3 wherein the priority encoding step employs "low-wins" priority encoding.

5. The method of claim 3 further including the step of employing one or more of the priority-encoded acceleration bit-strings to index the time-based array to identify the first data unit in the array having the lowest associated timestamp value.

6. The method of claim 1 wherein each location of the time-based array corresponds to a respective timestamp value within a first time window ranging from t=0 to $t=T_W$, and further including the step of in the event the timestamp value associated with the next data unit to be transmitted over the network is greater than or equal to $T_W/2$, shifting the first time window forward in time by $T_W/2$ to obtain a next time window ranging from $t=T_W/2$ to $t=3T_W/2$.

7. The method of claim 6 wherein the receiving step includes receiving at least one first data unit at the network node, the at least one first data unit having an associated timestamp value within a range limited to $T_W/2$.

8. A system for scheduling the transmission of at least one data unit from a node on a communications network, the node including at least one input port and at least one output port, the input port being communicably coupleable to the output port, comprising:

a first memory disposed at each output port of the network node, the first memory comprising at least two linear time-indexed arrays having a plurality of locations, each location corresponding to a respective timeslot within a time window ranging from time $t=0$ to $t=500$ msec, at least one of the two linear time-indexed arrays configured to buffer at least one first data unit, each first data unit having an associated timestamp value, a packet buffer, a packet descriptor and a pointer to the packet buffer, the timestamp value having a granularity of about a minimum packet size;

a cross-connect which transfers the first data unit from the input port to the first memory and inserts the packet descriptor into the respective timeslot; and a controller configured to insert the at least one first data unit into a respective location of the time-indexed array based on the associated timestamp value, partition a binary value of the timestamp associated with the first data unit into a plurality of sub-fields, each sub-field comprising one or more bits, use the plurality of sub-fields to generate a corresponding plurality of acceleration bit-strings for use in identifying the first data unit in the time-based array having a lowest associated timestamp value, extract the identified first data unit having the lowest associated timestamp value from the time-based array, indicate with a variable there is a valid data unit in the respective location, and designate the extracted first data unit as a next data unit to be transmitted over the network.

9. The system of claim 8 wherein each location of the time-based array corresponds to a respective timestamp value within a first time window ranging from $t=0$ to $t=T_W$, and the controller is further configured to, in the event the timestamp value associated with the next data unit to be transmitted over the network is greater than or equal to $T_W/2$, shift the first time window forward in time by $T_W/2$ to obtain a next time window ranging from $t=T_W/2$ to $t=3 T_W/2$.

10. The system of claim 8 wherein the network node has a predetermined total bandwidth and the time-based array has a size sufficient to support the total bandwidth of the node.

11. The system of claim 8 wherein the first memory comprises a plurality of linear time-indexed arrays, each array corresponding to a respective channel in the network.

12. The system of claim 11 wherein each array has a size proportional to a fractional amount of a predetermined total bandwidth of the network node.

* * * * *

UNITED STATES PATENT AND TRADEMARK OFFICE
CERTIFICATE OF CORRECTION

PATENT NO.        : 7,418,523 B2                                                Page 1 of 1
APPLICATION NO.   : 10/056609
DATED             : August 26, 2008
INVENTOR(S)       : Pettyjohn et al.

It is certified that error appears in the above-identified patent and that said Letters Patent is hereby corrected as shown below:

In Column 8, Line 15, delete "it-strings" and insert -- bit-strings --, therefor.

In Column 12, Line 31, in Claim 1, delete "timeslot:" and insert -- timeslot; --, therefor.

Signed and Sealed this

Thirty-first Day of March, 2009

JOHN DOLL
*Acting Director of the United States Patent and Trademark Office*